(12) United States Patent  (10) Patent No.: US 8,100,016 B2
Nishizawa et al.  (45) Date of Patent: Jan. 24, 2012

(54) VIBRATORY SENSOR

(75) Inventors: Ryuta Nishizawa, Suwa (JP); Takahiro Kameta, Fujisawa (JP)

(73) Assignee: Seiko Epson Corporation (JP)

( * ) Notice: Subject to any disclaimer, the term of this patent is extended or adjusted under 35 U.S.C. 154(b) by 316 days.

(21) Appl. No.: 12/556,778

(22) Filed: Sep. 10, 2009

(65) Prior Publication Data

US 2010/0064813 A1     Mar. 18, 2010

(30) Foreign Application Priority Data

Sep. 17, 2008   (JP) ................. 2008-237516

(51) Int. Cl.
 *G01H 13/00* (2006.01)
 *H01L 41/04* (2006.01)
(52) U.S. Cl. .......................... 73/651; 310/367
(58) Field of Classification Search ............ 73/651, 73/514.29, 514.34; 310/367
 See application file for complete search history.

(56) References Cited

U.S. PATENT DOCUMENTS

| | | | | |
|---|---|---|---|---|
| 5,475,613 A * | 12/1995 | Itoga et al. | ......... | 702/39 |
| 5,574,220 A | 11/1996 | Amand et al. | | |
| 6,716,173 B2 * | 4/2004 | Satoh | ......... | 600/447 |
| 6,943,484 B2 * | 9/2005 | Clark et al. | ......... | 310/334 |
| 7,331,234 B2 * | 2/2008 | Tsujita et al. | ......... | 73/606 |
| 7,372,346 B2 * | 5/2008 | Tilmans et al. | ......... | 333/187 |
| 7,469,595 B2 * | 12/2008 | Kessler et al. | ......... | 73/802 |
| 7,681,433 B2 * | 3/2010 | Konno et al. | ......... | 73/24.06 |
| 7,802,475 B2 * | 9/2010 | Nishizawa et al. | ......... | 73/514.29 |
| 7,986,198 B2 * | 7/2011 | Nakatsuka et al. | ......... | 333/133 |
| 2008/0087083 A1 | 4/2008 | Nishizawa et al. | | |

FOREIGN PATENT DOCUMENTS

| | | |
|---|---|---|
| JP | 63-284440 | 11/1988 |
| JP | 4-505509 | 9/1992 |
| JP | 9-005176 | 1/1997 |
| JP | 2008-209388 | 9/2008 |
| JP | 2008-209389 | 9/2008 |
| WO | 91-13328 | 9/1991 |

OTHER PUBLICATIONS

William C. Albert, "Force Sensing Using Quartz Crystal Flexure Resonators", 38th Annual Frequency Control Symposium, 1984, pp. 233-239.

* cited by examiner

*Primary Examiner* — J M Saint Surin
(74) *Attorney, Agent, or Firm* — Harness, Dickey & Pierce, P.L.C.

(57) ABSTRACT

A vibratory sensor includes a resonator element including (i) a first base portion and a second base portion, each ot the first and the second base portions having an upper main surface and a lower main surface, (ii) a resonating arm extended in a beam shape between the first and the second base portions to be vibrated at a predetermined resonance frequency, (iii) a first narrow portion formed by reducing a width of a portion extended from the first base portion to be smaller than a width of the first base portion in a direction orthogonal to an extending direction of the resonating arm, (iv) a second narrow portion formed by reducing a width of a portion extended from the second base portion to be smaller than a width of the second base portion in the direction orthogonal to the extending direction of the resonating arm, (v) a first support portion extended from the first narrow portion in a direction opposite to the first base portion, and (vi) a second support portion extended from the second narrow portion in a direction opposite to the second base portion.

6 Claims, 5 Drawing Sheets

VIBRATORY SENSOR

BACKGROUND

1. Technical Field

The present invention relates to a vibratory sensor detecting a change in a resonance frequency of a piezoelectric resonator element occurring due to a force exerted by acceleration or the like.

2. Related Art

There is a vibratory sensor known as a force sensor measuring a force generated by acceleration or the like. The vibratory sensor detects a magnitude of the force by detecting a change in the resonance frequency of a piezoelectric resonator element occurring due to the force exerted by the acceleration or the like (e.g. See JP-T-40505509 (FIG. 1) and "Force Sensing Using Quartz Crystal Fexure Resonators", 38th Annual Frequency Control Symposium 1984, pp 233-239, by W. C. Albert).

Figure 6:
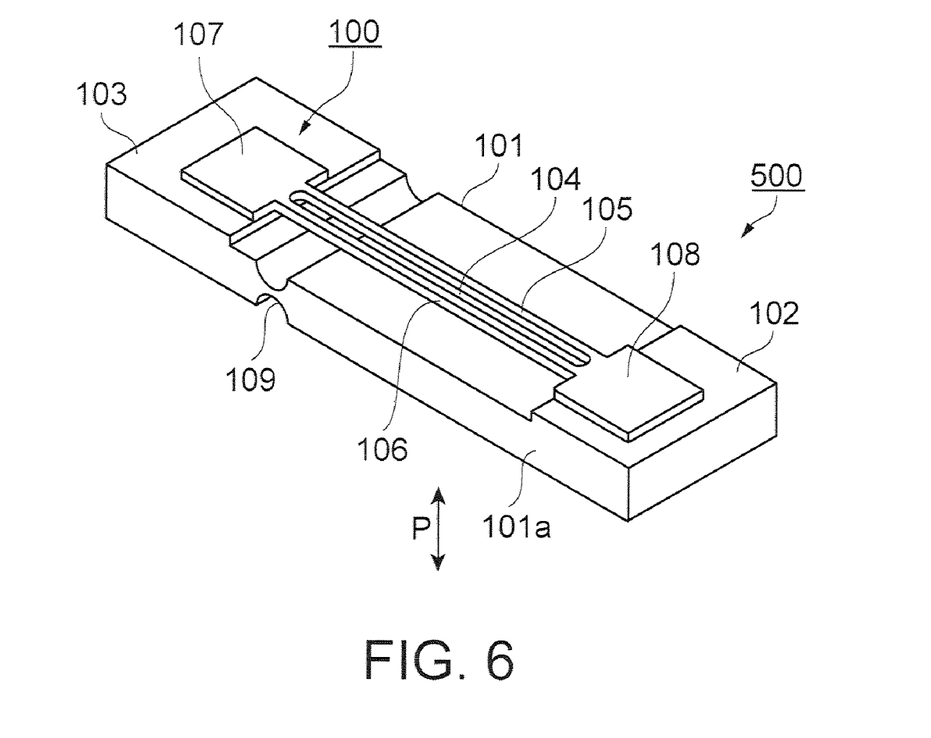
FIG. 6 is a schematic perspective view of a conventional acceleration sensor.

Hereinafter, a structure of an acceleration sensor as an example of the vibratory sensor will be described. FIG. 6 is a perspective view schematically showing a conventional acceleration sensor. As shown in FIG. 6, an acceleration sensor 500 includes two connection boards 102, 103 formed on a base 101, and a resonator element 100 connected to the connection boards 102 and 103. The resonator element 100 is made of a piezoelectric material such as quartz crystal. The resonator element 100 includes resonating arms 105, 106 formed by splitting by a through-hole 104, and two base portions 107 and 108 extended from opposite ends of the resonating arms 105 and 106.

Now, detection of acceleration will be briefly described by using an example in which acceleration in a thickness direction (a P direction) of the resonator element 100 is exerted to the acceleration sensor 500. Due to acceleration exerted on the acceleration sensor 500, the base 101 bends by movement of a second base portion 101a of the second base 108 in a rotating direction around a hinge 109 as a fulcrum formed on the base 101. The acceleration sensor 500 detects a change in the resonance frequency caused by deformation of the resonating arms 105 and 106 occurring by the bending, thereby measuring a magnitude of the acceleration exerted. In this case, detection sensitivity is represented by a following formula (1). The formula (1) shows that the detection sensitivity becomes higher as a resonating arm length l becomes longer.

Formula 1

$$\Delta f = a_t \frac{mal^2}{Etw^3} \quad (1)$$

In the formula, a1 represents a constant number determined by support or the like; m represents a mass; a represents acceleration; E represents an elastic constant; l represents a resonating arm length; t represents a resonator element thickness; and w represents a resonating arm width.

Figure 7:
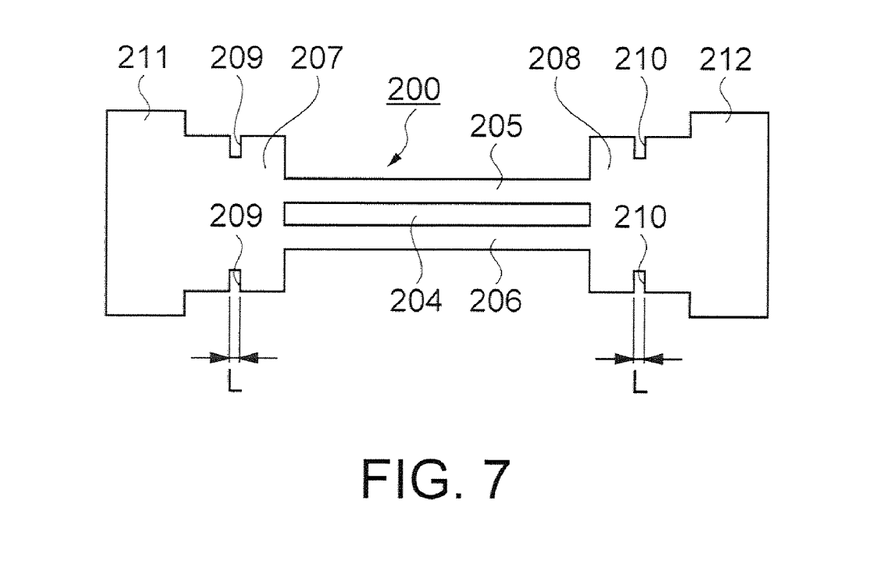
FIG. 7 is a plan view of a resonator element of the conventional acceleration sensor.

Vibration leaking from the resonating arms 105 and 106 is transmitted to the first and the second base portions 107 and 108. The leaking vibration reduces a Q value of the resonator element 100, thereby causing resonance frequency variation. Accordingly, the acceleration cannot be detected with high precision. Thus, to suppress such vibration leakage, there is proposed an acceleration sensor as shown in FIG. 7 (e.g. See JP-A-63-284440 (FIG. 4)). FIG. 7 is a plan view of a conventional resonator element used in the acceleration sensor.

As shown in FIG. 7, in a resonator element 200, there are integrally formed a pair of resonating arms 205, 206, a first base portion 207 and a second base portion 208 as two base portions, first narrow portions 209, second narrow portions 210, and support portions 211, 212. The resonating arms 205 and 206 are two beam-shaped portions formed by splitting by a through-hole 204. Opposite ends of the resonating arms 205 and 206 in an extending direction of the arms (a longitudinal direction) are extended to the first base portion 207 and the second base portion 208. The first and the second base portions 207 and 208, respectively, are extended in the extending direction of the resonating arms 205 and 206. The first base portion 207 has the first narrowed portions 209 where grooves are formed by providing a cutting at opposite ends such that a part of the first base portion 207 has a two-dimensionally small width. Similarly, the second base portion 208 has the second narrowed portions 210 with grooves formed by providing a cutting at opposite ends such that a part of the second base portion 208 has a two-dimensionally small width. In this case, a direction orthogonal to the extending direction of the resonating arms 205, 206 is equivalent to a width direction, and a length of the width direction is referred to as a width. Furthermore, at one side of the first base portion 207 is formed the support portion 211, whereas at one side of the second base portion 208 is formed the support portion 212. Forming the first and the second narrowed portions 209 and 210 can suppress leakage of vibration of the resonating arms 205 and 206 to the support portions 211 and 212.

However, in the acceleration sensor using the above-described resonator element 200, a length L of each of the first and the second narrowed portions 209 and 210 is made short. Accordingly, stress induced by a shock or the like imparted to the acceleration sensor is concentrated on the first and the second narrowed portions 209 and 210, whereby the resonator element 200 can have damage to the narrowed portions 209 and 210, and thus, acceleration detection is impossible. Particularly, when the acceleration sensor 500 of FIG. 6 uses the resonator element 200 of FIG. 7 instead of the resonator element 100, a force bending in the P direction is applied to the first and the second base portions 207 and 208. Then, for example, stress induced by the bending force tends to be concentrated on the narrowed portions 209 less rigid than the first base portion 207 (namely, on a neck portion between the two narrowed portions 209). Thus, when the length L of the narrowed portions 209 is short, stress is concentrated locally on the narrow region, and thereby, a large bending force occurs at the neck portion. Additionally, the narrowed portions 209 tend to be cut ends, thereby causing damage to the resonator element 100.

SUMMARY

In order to solve at least a part of the above-described problems, the present invention achieves an aspect and preferred features of the aspect as below. An advantage of the invention is to provide a vibratory sensor having high shock resistance.

A vibratory sensor according to an aspect of the invention includes a resonator element including (i) a first base portion and a second base portion, each of the first and the second base portions having an upper main surface and a lower main surface, (ii) a resonating arm extended in a beam shape between the first and the second base portions to be vibrated at a predetermined resonance frequency, (iii) a first narrow portion formed by reducing a width of a portion extended from the first base portion to be smaller than a width of the first base portion in a direction orthogonal to an extending direction of the resonating arm, (iv) a second narrow portion formed by reducing a width of a portion extended from the second base portion to be smaller than a width of the second base portion in the direction orthogonal to the extending direction of the resonating arm, (v) a first support portion extended from the first narrow portion in a direction opposite to the first base portion, and (vi) a second support portion extended from the second narrow portion in a direction opposite to the second base portion, a length ratio of the first narrow portion versus the first base portion in the extending direction of the resonating arm and a length ratio of the second narrow portion versus the second base portion in the extending direction of the resonating arm being in a range of 50 to 200% inclusive; and a base supporting the resonator element, the base being connected to one of upper and lower main surfaces of each of the first and the second support portions included in the resonator element.

In the vibratory sensor above, the length ratio of the first narrow portion versus the first base portion in the extending direction of the resonating arm and the length ratio of the second narrow portion versus the second base portion in the extending direction of the resonating arm are equal to or larger than 50% and equal to or smaller than 200%. That is, the lengths of the first and the second narrow portions are made long. This can prevent stress due to a shock or the like from being concentrated on the first and the second narrow portions, so that damage to the resonator element hardly occurs even if a shock or the like is exerted to the vibratory sensor. Consequently, the vibratory sensor exhibits high shock resistance.

Preferably, in the vibratory sensor, the resonating arm is split into at least two beams by a through-hole penetrating through an upper side and a lower side of the resonating arm.

In the vibratory sensor above, at least two resonating arms are formed, thereby improving vibration efficiency in the resonating arm due to a resonance effect between the resonating arms. As a result, in the vibratory sensor, more stable vibration can be obtained.

Preferably, in the vibratory sensor, a connection is made in a two-dimensionally curved shape both among the first narrow portion, the first base portion, and the first support portion and among the second narrow portion, the second base portion, and the second support portion.

In the vibratory sensor above, the first narrow portion and the second narrow portion, respectively, are connected to the other portions in the two-dimensionally curved shape, thereby enabling stress concentration to be further prevented. Consequently, the vibratory sensor can exhibit higher shock resistance.

Preferably, in the vibratory sensor, each of the first and the second support portions includes extending portions extended in the direction orthogonal to the extending direction of the resonating arm and a fixed portion extended from each of the extending portions in a manner parallel to the resonating arm to have an open end; and the base is connected to the one of the main surfaces of each of the first and the second support portions including the fixed portion in the resonator element.

In the vibratory sensor above, the base is connected to the resonator element in the region including the fixed portion more distant from the resonating arm. Thus, the base and the resonator element can be connected in the region where there occurs a low level of leaking vibration. This can further suppress influence of the leaking vibration in concert with the advantageous effect of the first and the second narrow portions, as well as can provide a highly reliable vibratory sensor with an improved shock resistance.

Preferably, in the vibratory sensor, the base includes a hinge portion formed in a groove shape with a small thickness, a first base located at one side of the hinge portion, and a second base located at an other side of the hinge portion, the first base being connected to the first support portion and the second base being connected to the second support portion.

In the vibratory sensor above, by forming the groove-shaped hinge portion, the resonator element is bent only by a force vertically applied to the resonator element, while avoiding influence by a horizontal force. Accordingly, sensitivity other than a sensitivity of a detection axis required, namely, a sensitivity of an other axis can be reduced. Thereby, the vibratory sensor can perform high-precision detection.

Preferably, in the vibratory sensor, the base includes a first base, a second base connected to the first base by a flexible connecting member, and a third base connected to the second base by an other flexible connecting member, the first base being connected to the first support portion and the second base being connected to the second support portion.

In the vibratory sensor above, acceleration in the extending direction of the resonating arm can be detected with accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the accompanying drawings. For convenience of illustration, the drawings referred to hereinbelow are schematic views, where scales of members and of height and width are different from actual ones.

First Embodiment

Figure 1A:
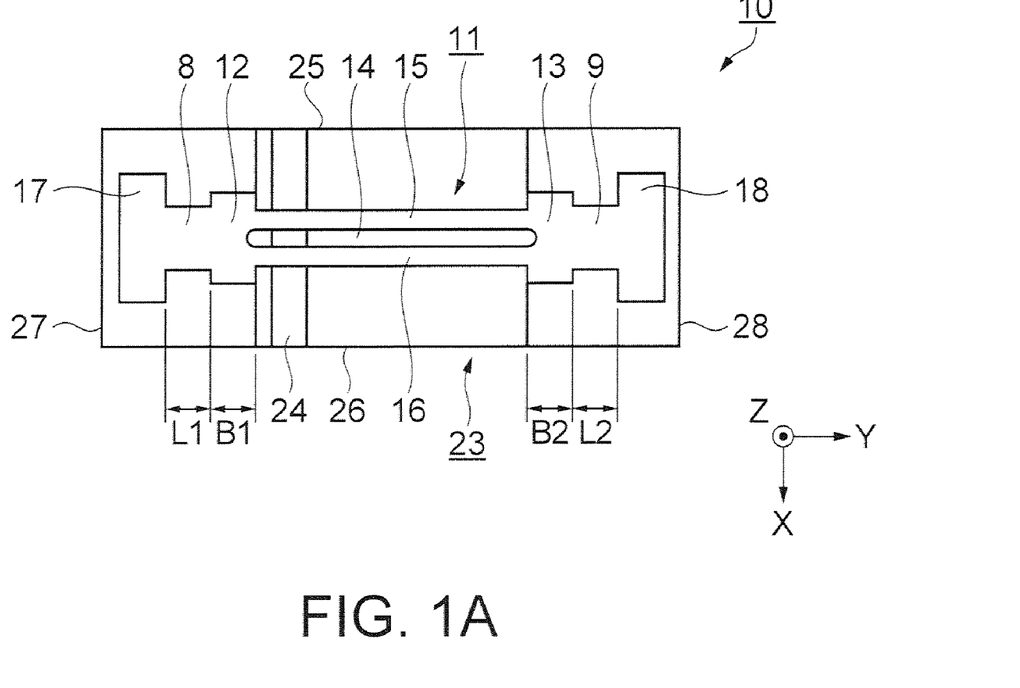
FIGS. 1A and 1B are a plan view and a front sectional view schematically showing an acceleration sensor as an example of a vibratory sensor according to a first embodiment of the invention.
Figure 1B:
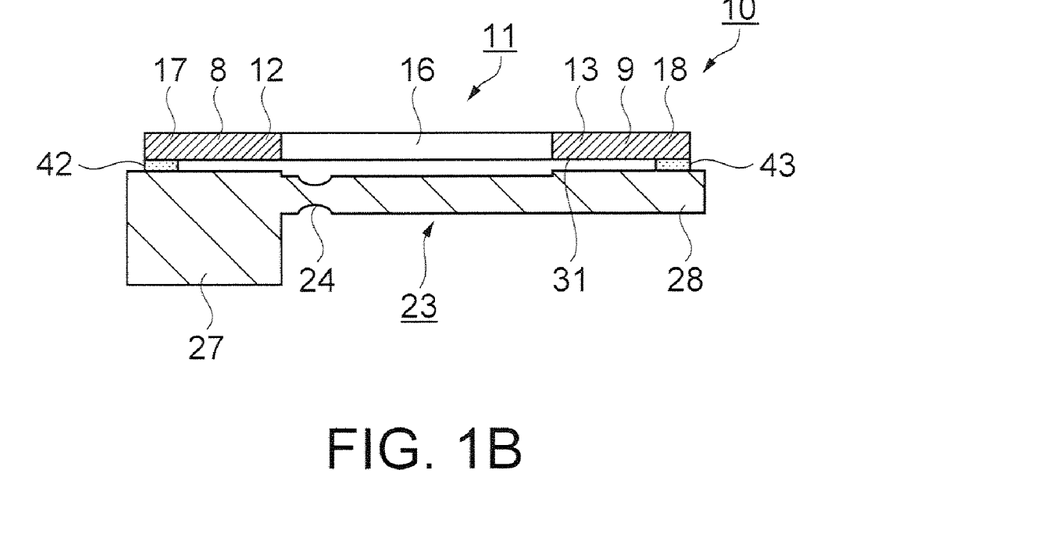

FIGS. 1A and 1B show an acceleration sensor 10 as an example of a vibratory sensor according to a first embodiment of the invention. FIG. 1A is a schematic plan view of the acceleration sensor as the first embodiment, and FIG. 1B is a schematic front sectional view of the acceleration sensor of the first embodiment.

As shown in FIG. 1, the acceleration sensor 10 includes a base 23 and a resonator element 11 supported by the base 23.

The resonator element 11 is made of a piezoelectric material, such as titanate ($PbTiO_3$), lead zirconate titanate (PZT), zinc oxide (ZnO), or quartz crystal. The first embodiment exemplifies and illustrates the resonator element 11 made of quartz crystal having excellent frequency-temperature characteristics and a high Q value.

The resonator element 11 (a quartz crystal resonator element) is split into resonating arms 15 and 16 having a beam shape by a through-hole 14. The resonating arms 15 and 16 are bent and vibrated at a predetermined resonance frequency in a two-dimensional direction. The resonator element 11 further includes a first base portion 12, a first narrow portion 8, and a first support portion 17, provided sequentially from a first end of the resonating arms 15 and 16, as well as a second base portion 13, a second narrow portion 9, and a second support portion 18, provided sequentially from a second end of the resonating arms 15 and 16.

Each of the first narrow portion 8 and the second narrow portion 9 is formed so as to have a width smaller than a width of each of the first and the second base portions 12 and 13 in an orthogonal direction (an X direction shown in FIG. 1A, which is hereinafter referred to as "X direction") with respect to the extending direction of the resonating arms 15 and 16 (a Y direction shown in FIG. 1A, which is hereinafter referred to as "Y direction"). In other words, the first and the second narrow portions 8 and 9, respectively, correspond to portions recessed from two side lines along the Y direction toward a center in the first and the second base portions 12 and 13, respectively. Additionally, a length of each of the first and the second narrow portions 8 and 9 (hereinafter referred to as "narrow portion length") in the extending direction of the resonating arms 15 and 16 is determined in correlation with a length of each of the first and the second base portions 12 and 13 (hereinafter referred to as "base portion length") in the extending direction of the resonating arms 15 and 16. Specifically, a ratio of the narrow portion length versus the base portion length is determined so as to be equal to or larger than 50% and equal to or smaller than 200%.

Setting the ratio of the narrow portion length versus the base portion length in the above range can prevent vibration of the resonating arms 15 and 16 from leaking to the first and the second support portions 17 and 18, and also can prevent shock stress from being concentrated on the first and the second narrow portions 8 and 9 to avoid damage to the resonator element 11.

Figure 2:
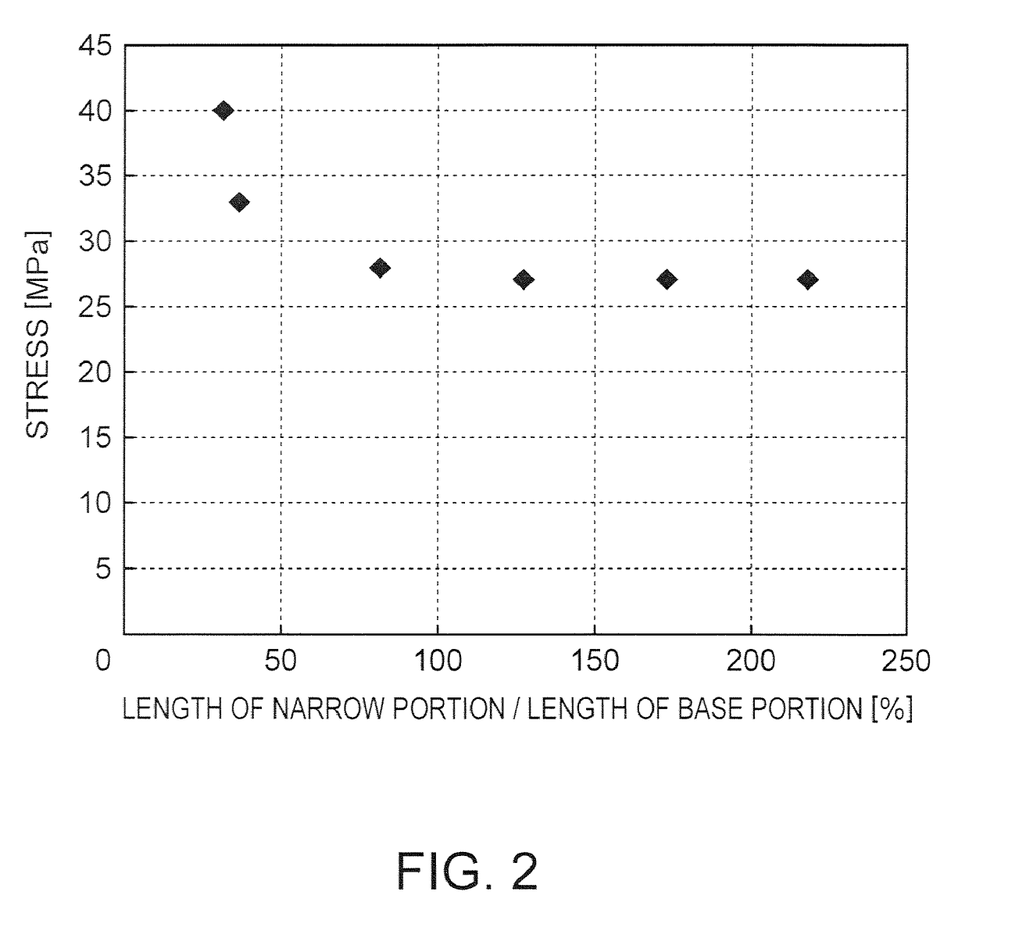
FIG. 2 is a graph representing a correlation between a ratio of a narrow portion length versus a base portion length and magnitude of stress exerted on each narrow portion.

FIG. 2 is an illustrative graph representing a correlation between the ratio of the narrow portion length versus the base portion length and magnitude of stress on each narrow portion. In FIG. 2, a lateral axis indicates the ratio of the narrow portion length versus the base portion length (%), and a longitudinal axis indicates stress (MPa) occurring on the each narrow portion.

As shown in FIG. 2, a large level of stress occurs in a small range of the length ratio. As the length ratio increases, the stress reduces rapidly (in a quadratic curve). When the length ratio is equal to or larger than approximately 50%, the stress magnitude does not change. However, since the base portion length increases along with increase in the length ratio, setting the length ratio to an extremely large value hinders miniaturization of the resonator element 11. Thus, in order to incorporate the resonator element 11 in a compact acceleration sensor demanded, it is necessary to set the length ratio to a value equal to or smaller than 200%.

For further miniaturization of the resonator element 11, the ratio of the narrow portion length versus the base portion length is desirably reduced to preferably set to a range of 50 to 100%. In the present embodiment, a narrow portion length L1 of the first narrow portion 8 is formed so as to be approximately 80% in a length ratio with respect to a base portion length B1 of the first base portion 12. Similarly, a narrow portion length L2 of the second narrow portion 9 is formed so as to be approximately 80% in a length ratio with respect to a base portion length B2 of the second base portion 13.

The base 23 in the embodiment includes a hinge portion 24 with a groove formed on both of an upper surface and a lower surface of the hinge portion 24 from a first end face 25 to a second end face 26 in a width direction of the base 23. Then, the base 23 has two regions based on the hinge portion 24. The two regions include a first base 27 provided on a region with the first base portion 12 and a second base 28 provided on a region with the second base portion 13. The first base 27 corresponds to a fixed portion and the second base 28 corresponds to a movable portion (may also be referred to as a cantilever portion). The hinge portion 24 is formed in a position deviating toward the first base portion 12 from the center in the extending direction of the resonating arms 15 and 16. The hinge portion 24 of the embodiment has the groove formed on both of the upper and the lower surfaces of the base 23, but may have a groove on either one of the surfaces thereof.

In the resonator element 11, a main surface (a lower surface) 31 of the first support portion 17 is supported by the first base 27, and a main surface 31 (a lower surface) of the second support portion 18 is supported by the second base 28. The main surfaces 31 of the first and the second support portions 17 and 18, respectively, are fixed to the base 23, for example, by means of adhesives 42 and 43, respectively. In this manner, the resonator element 11 is fixed to the base 23. Additionally, a conductive adhesive may be used to connect the resonator element 11 to a not-shown excitation electrode, for example.

Detection of acceleration by the acceleration sensor 10 will be roughly described. The resonating arms 15 and 16 of the acceleration sensor 10 bend and vibrate at a predetermined resonance frequency in an X axis direction (a width direction of the resonator element 11). When acceleration in a Z direction of the drawing is applied to the acceleration sensor 10, an inertia force moves the second base portion 28 having a large mass in a direction (a −Z direction) opposite to the acceleration direction with respect to the hinge portion 24 as a fulcrum, since the first base 27 is fixed as the fixed portion. This allows the base 23 to bend, whereby tensile stress is applied, in a Y axis direction, to the resonator element 11 (the resonating arms 15 and 16) fixed to the first and the second bases 27 and 28.

When such a tensile stress occurs, the resonance frequency of the resonating arms 15 and 16 vibrating increases, whereas when compressive stress occurs, the resonance frequency thereof decreases. Accordingly, in the above-described example, the resonance frequency of the resonating arms 15 and 16 increases. If acceleration in a direction opposite to the above direction is applied, the second base 28 also moves in the opposite direction (namely, the base 23 also bends in the opposite direction), so that the resonance frequency of the resonating arms 15 and 16 is reduced. An amount of the change in the resonance frequency is detected by a detection circuit (not shown) and then, the detected resonance frequency is converted into a voltage by a conversion circuit (not shown) to be detected as acceleration. In this manner, acceleration applied to the acceleration sensor 10 can be detected.

The acceleration sensor of the embodiment uses the resonator element 11 formed by setting the ratio of the narrow portion length versus the base portion length to the range of 50 to 200%, and more preferably to the range of 50 to 100%. This can prevent leakage of the vibration of the resonating arms 15 and 16 to the first and the second support portions 17 and 18, as well as can prevent concentration of shock stress on the first and the second narrow portions 8 and 9 to avoid damage to the resonator element 11. Thus, the acceleration sensor 10 can have high characteristic stability and high shock resistance.

Second Embodiment

Figure 3A:
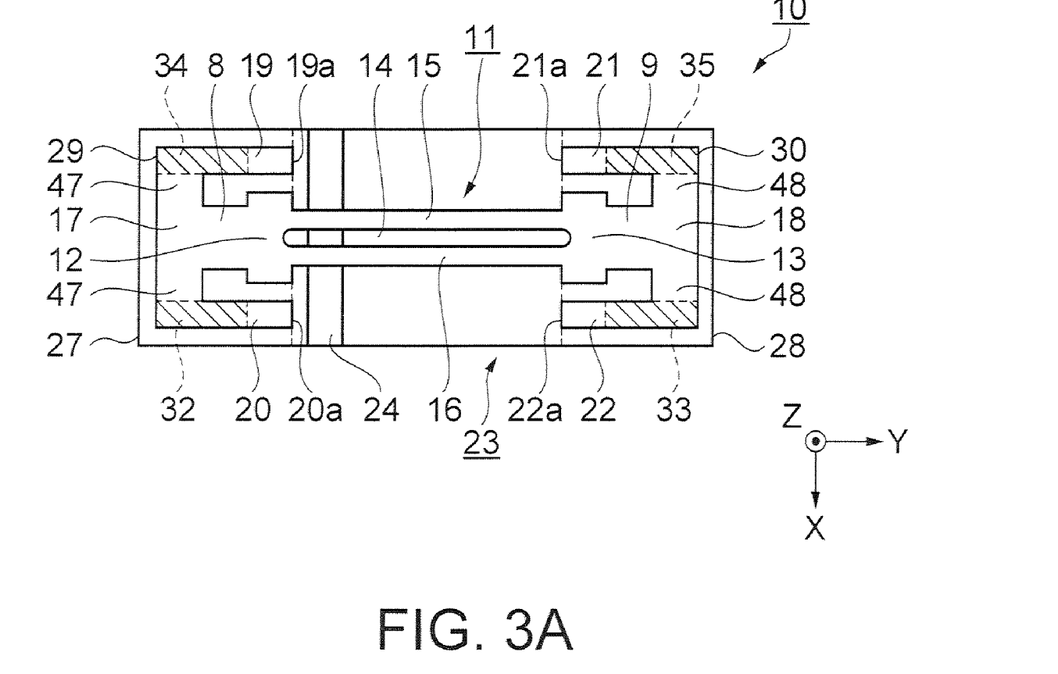
FIGS. 3A and 3B are a plan view and a front sectional view schematically showing an acceleration sensor as an example of a vibratory sensor according to a second embodiment of the invention.
Figure 3B:
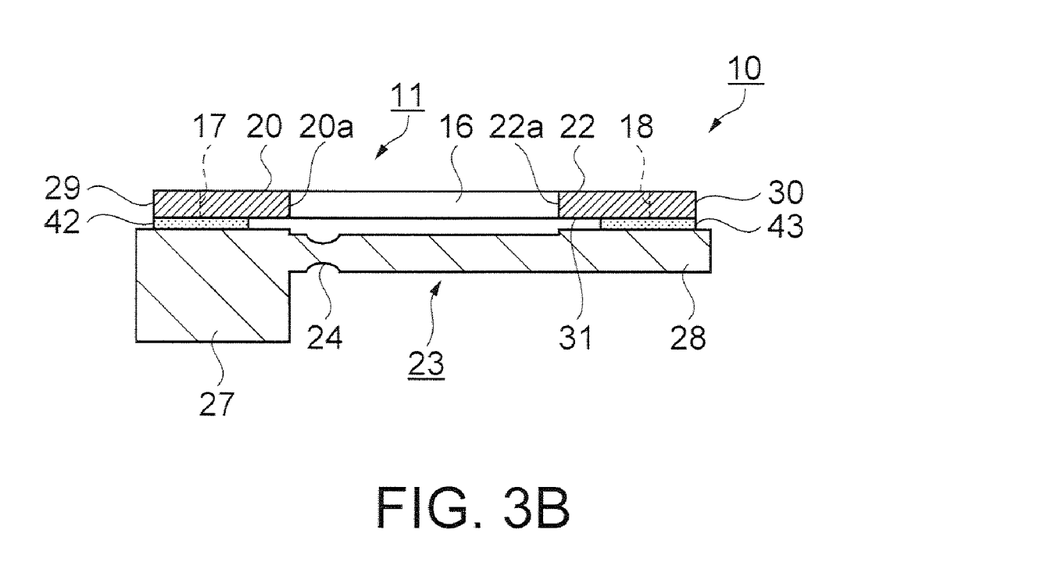

FIGS. 3A and 3B are illustrative views of an acceleration sensor as an example of a vibratory sensor according to a second embodiment of the invention. FIGS. 3A and 3B schematically show an acceleration sensor 10 as the second embodiment. FIG. 3A is a schematic plan view of the acceleration sensor 10, and FIG. 3B is a schematic front sectional view of the acceleration sensor 10. The second embodiment includes a resonator element 11 having a structure different from that of the resonator element described in the first embodiment, whereas the second embodiment uses the same base as that used in the first embodiment. Accordingly, the same reference numeral is given to the base and a description thereof is omitted below.

As shown in FIGS. 3A and 3B, the acceleration sensor 10 includes the base 23 and the resonator element 11 supported by the base 23.

The resonator element 11 of the second embodiment is made of a same piezoelectric material as that in the first embodiment. Although a description of the piezoelectric material is omitted, the second embodiment also uses quartz crystal with high frequency-temperature characteristics and a high Q value.

The resonator element 11 (the quartz crystal resonator element) has the resonating arms 15 and 16 each having the beam shape and bending and vibrating at a predetermined resonance frequency in a two-dimensional direction. The resonator element 11 further includes the first base portion 12, the first narrow portion 8, and the first support portion 17, which are provided sequentially from the first end of the resonating arms 15 and 16, as well as the second base portion 13, the second narrow portion 9, and the second support portion 18, which are provided sequentially from the second end of those arms. In addition, there are formed extending portions 47 extended to both sides of the X direction in the drawing from the first support portion 17, and fixed portions 19 and 20 extended from the extending portions 47 in a manner parallel to the resonating arms 15, 16 to have open ends 19a and 20a. Furthermore, there are formed extending portions 48 extended to both sides of the X direction in the drawing from the second support portion 18, and fixed portions 21 and 22 extended from the extending portions 48 in a manner parallel to the resonating arms 15, 16 to have open ends 21a and 22a.

The first and the second narrow portions 8 and 9 are the same as those in the first embodiment and thus descriptions thereof are omitted.

Setting the ratio of the narrow portion length versus the base portion length to the same ratio as in the first embodiment can similarly prevent vibration of the resonating arms 15 and 16 from leaking to the first and the second support portions 17 and 18, and also can prevent concentration of shock stress on the first and the second narrow portions 8 and 9 to avoid damage to the resonator element 11.

In the resonator element 11 of the second embodiment, main surfaces 31 (lower surfaces) of the fixed portions 19 and 20 are supported at connection regions 32 and 34 by the first base 27 to be fixed with the adhesive 42. In addition, main surfaces 31 (lower surfaces) of the fixed portions 21 and 22 are supported at connection regions 33 and 35 by the second base 28 to be fixed with the adhesive 43. Thereby, the resonator element 11 is fixed to the base 23. For example, when the resonator element 11 is connected to a not-shown excitation electrode, a conductive adhesive may be used.

Next will be described the connection regions 32, 33, 34, and 35 indicated by diagonal lines in FIG. 3A. The connection regions 32 and 34, respectively, include regions where the respective extending portions 47 intersect with the fixed portions 19 and 20, respectively. Additionally, the connection regions 33 and 35, respectively, include regions where the respective extending portions 48 intersect with the fixed portions 21 and 22, respectively.

Each of the connection regions 32, 33, 34, and 35 has a first end located in a center in a longitudinal direction of each of the fixed portions 19, 20, 21, and 22, and a second end reaching end portions 29 and 30 of the respective extending portions 47 and 48. The end portions 29 and 30 also correspond to opposite ends of the resonator element 11 in the longitudinal direction.

The resonator element 11 is fixed to the base 23 by the connection regions 32, 33, 34, and 35 as described above. Accordingly, in addition to the advantageous effect of the first and the second narrow portions 8 and 9, there is an advantage that the positions connecting the resonator element 11 to the base 23 are distant from the resonating arms 15 and 16, so that influence of leaking vibration can be further prevented. Furthermore, fixing reliability is further improved, since the connection regions 32 to 35 include the intersecting region of the extending portions 47 and the fixed portions 19, 20, the intersecting region of the extending portions 48 and the fixed portions 21, 22, and the end portions 29, 30 of the extending portions 47, 48. Still furthermore, the extending portions 47 and 48 effectively serve to reduce stress due to a shock or the like, as in the first and the second narrow portions 8 and 9. Thus, shock resistance is further improved in the acceleration sensor 10.

Third Embodiment

Figure 4:
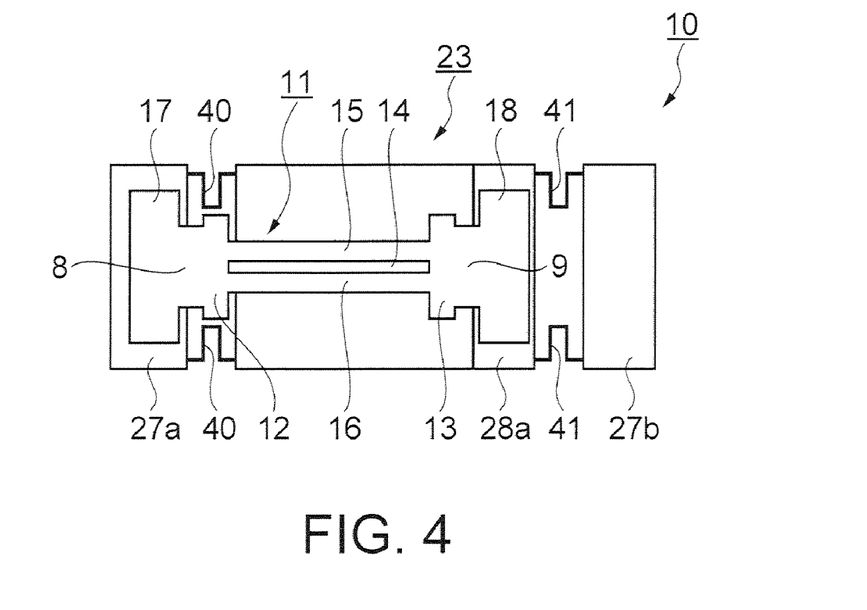
FIG. 4 is a schematic plan view of an acceleration sensor as an example of a vibratory sensor according to a third embodiment of the invention.

FIG. 4 shows an acceleration sensor as an example of a vibration sensor according to a third embodiment of the invention. FIG. 4 is a schematic plan view of an acceleration sensor 10 as the third embodiment. The third embodiment uses the same resonator element as that used in the first embodiment, and thus, the same reference numeral is given to the resonator element and a description thereof is omitted.

As shown in FIG. 4, the acceleration sensor 10 includes a base 23 and the resonator element 11 supported by the base 23.

The base 23 includes a first base 27a, a second base 28a, a third base 27b, and leaf springs 40, 41 as flexible connecting members. The first base 27a is connected to the second base 28a via the leaf spring 40 bent in a rectangular shape and elastic, and the second base 28a is connected to the third base 27b via the leaf spring 41 bent in a rectangular shape and elastic. The present embodiment describes the structural example using the elastic leaf springs 40 and 41 connecting the respective bases to each other. However, instead of the springs, for example, the bases may be connected to each other by coil springs or elastic members such as resin members.

In the resonator element 11 of the third embodiment, a not-shown main surface (a lower surface) of the first support portion 17 is supported by the first base 27a. Additionally, a not-shown main surface (a lower surface) of the second support portion 18 is supported by the second base 28a. Each of the main surfaces is fixed with an adhesive or the like to thereby fix the resonator element 11 to the base 23.

In the acceleration sensor 10 thus formed, the first and the third bases 27a and 27b are fixed to a base member (not shown), whereby the second base 28a can be freely moved by expansion and contraction of the leaf springs 40 and 41 in the extending direction of the resonating arms 15 and 16. Consequently, the acceleration sensor 10 can appropriately detect acceleration in the extending direction of the resonating arms 15 and 16.

Figure 5:
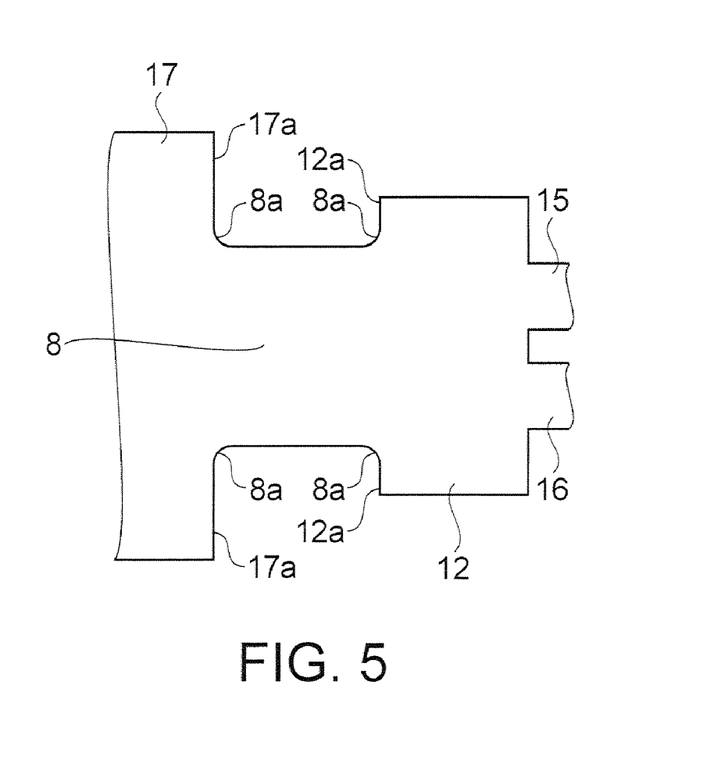
FIG. 5 is an enlarged plan view of a first narrow portion.

In the first and the second narrow portions 8 and 9 described above, as shown in an enlarged plan view of the first narrow portion in FIG. 5, preferably, an intersecting portion 8a between an outer peripheral line 12a of the first base portion 12 and an outer peripheral line 17a of the first support portion 17 is two-dimensionally connected in a curved shape. The present embodiment uses an arch shape. However, the curved shape is not restricted to a specific one as long as no intersection angle is formed. In addition, although FIG. 5 illustrates the first narrow portion 8, the second narrow portion 9 desirably has the same structure as in the first narrow portion 8 described above.

In this manner, connecting the intersection angle 8a two-dimensionally in the curved shape can prevent stress concentrated on an intersection angle, thereby enabling stress concentration to be further prevented. As a result, shock resistance can be further improved in the acceleration sensor 10.

In addition, in the described example above, the first and the second narrow portions 8 and 9, respectively, are provided in positions connecting to the first and the second support portions 17 and 18, respectively. However, that is merely an example. For example, the first and the second narrow portions 8 and 9, respectively, may be located in the first and the second base portions 12 and 13, respectively, namely, located in middle positions of the first and the second base portions 12 and 13, respectively.

Furthermore, in the embodiments above, the acceleration sensor is described as an example of the vibratory sensor. However, for example, the embodiments can also be applied to a force sensor, a pressure sensor, and the like. The entire disclosure of Japanese Patent Application No. 2008-237516, filed Sep. 17, 2008 is hereby expressly incorporated by reference herein.

What is claimed is:

1. A vibratory sensor, comprising:
a resonator element including (i) a first base portion and a second base portion, each of the first and the second base portions having an upper main surface and a lower main surface, (ii) a resonating arm extended in a beam shape between the first and the second base portions to be vibrated at a predetermined resonance frequency, (iii) a first narrow portion formed by reducing a width of a portion extended from the first base portion to be smaller than a width of the first base portion in a direction orthogonal to an extending direction of the resonating arm, (iv) a second narrow portion formed by reducing a width of a portion extended from the second base portion to be smaller than a width of the second base portion in the direction orthogonal to the extending direction of the resonating arm, (v) a first support portion extended from the first narrow portion in a direction opposite to the first base portion, and (vi) a second support portion extended from the second narrow portion in a direction opposite to the second base portion, a length ratio of the first narrow portion versus the first base portion in the extending direction of the resonating arm and a length ratio of the second narrow portion versus the second base portion in the extending direction of the resonating arm being in a range of 50 to 200% inclusive; and
a base supporting the resonator element, the base being connected to one of upper and lower main surfaces of each of the first and the second support portions included in the resonator element.

2. The vibratory sensor according to claim 1, wherein the resonating arm is split into at least two beams by a through-hole penetrating through an upper side and a lower side of the resonating arm.

3. The vibratory sensor according to claim 1, wherein a connection is made in a two-dimensionally curved shape both among the first narrow portion, the first base portion, and the first support portion and among the second narrow portion, the second base portion, and the second support portion.

4. The vibratory sensor according to claim 1, wherein each of the first and the second support portions includes extending portions extended in the direction orthogonal to the extending direction of the resonating arm, and a fixed portion extended from each of the extending portions in a manner parallel to the resonating arm to have an open end; and the base is connected to the one of the main surfaces of each of the first and the second support portions including the fixed portion in the resonator element.

5. The vibratory sensor according to claim 1, wherein the base includes a hinge portion formed in a groove shape with a small thickness, a first base located at one side of the hinge portion, and a second base located at an other side of the hinge portion, the first base being connected to the first support portion and the second base being connected to the second support portion.

6. The vibratory sensor according to claim 1, wherein the base includes a first base, a second base connected to the first base by a flexible connecting member, and a third base connected to the second base by an other flexible connecting member, the first base being connected to the first support portion and the second base being connected to the second support portion.

* * * * *